Patented Oct. 30, 1945

2,387,831

UNITED STATES PATENT OFFICE 2,387,831

PLASTIC COMPOSITION CONTAINING POLY-VINYL PARTIAL ACETAL RESINS

Howard D. Cogan and Richard W. Quarles, Pittsburgh, Pa., assignors to Carbide and Carbon Chemicals Corporation, a corporation of New York No Drawing. Application June 11, 1943, Serial No. 490,452

13 Claims. (Cl. 260—43)

The subject of this invention is an improvement in plastic compositions containing water-insoluble polyvinyl partial acetal resins.

Plastic compositions containing polyvinyl partial acetal resins have been proposed for use in adhesives, paints, lacquers, molding compositions, impregnating compositions, insulating compositions and the like. Where resistance to alcohol and other solvents is not required, these resins have been utilized extensively for such purposes. While some degree of insolubilization of these products can be obtained by heating, in many instances it is impractical to insolubilize these resins by a heat treatment. To be effective, the heat treatment is usually so severe that discoloration or decomposition of the resin occurs.

According to this invention, a method of insolubilizing polyvinyl partial acetal resins has been discovered which is effective without external heating of the resins, although heat may be employed to accelerate the insolubilization. It has been discovered that glyoxal and other aliphatic dicarbonylic compounds, such as methyl glyoxal, will react or combine with polyvinyl partial acetal resins to render them insoluble in alcohol and other solvents. In addition to insolubilizing them, the process also raises the softening or fusion point of the resins. The treatment with the aliphatic dicarbonylic compounds is preferably carried out at the time the polyvinyl partial acetal resins are utilized in plastic compositions, and not during the manufacture of the resins. The glyoxal or methyl glyoxal may be employed, as the compounds themselves, but it is often more convenient to utilize an aqueous solution of these dicarbonylic compounds. In this form, glyoxal and methyl glyoxal may exist as hydrates, polymers or hydrated polymers, and the formula corresponding to tetrahydroxydioxane has been postulated for aqueous glyoxal. All such modifications react in a similar manner to the original dicarbonylic compounds, and they are included within the scope of the claims. Because glyoxal is more readily available, the invention will be described with reference to this material, but it is understood that methyl glyoxal may be employed in place of the glyoxal.

According to one method of practicing the invention the polyvinyl partial acetal resins, with or without a compatible plasticizer therefor, and an aqueous solution of glyoxal are dissolved in a suitable solvent, and a film is deposited from this solution to serve as an adhesive or coating. On air-drying a plasticized film of polyvinyl partial acetal resin containing the glyoxal, insolubilization will occur in a maximum of about two days. In the absence of plasticizers, insolubilization will occur in about 24 hours. Heating accelerates the insolubilization, but care should be exercised to insure that the glyoxal is not vaporized during the heating before insolubilization occurs. The temperature at which such heating is carried out need not exceed those temperatures at which the resin is discolored or decomposed; for example, the temperature need not exceed 275° F.

The polyvinyl partial acetal resin may also be insolubilized by mixing the glyoxal and the resin, either with or without a plasticizer, on a heated roll mill. The temperature and duration of the milling operation, for instance, 225° to 275° F. for 10 to 15 minutes, may be such that appreciable insolubilization of the resin occurs immediately. On the other hand, the milling operation may serve merely to mix the resin and glyoxal, and further insolubilization may occur on aging or baking the composition.

The mechanism of the change by which the polyvinyl partial acetal resins are insolubilized and their softening point raised is not known for certain. It is possible that the glyoxal reacts with the free hydroxyl groups of the resin to form additional acetal groups, or that, the glyoxal reacts with the hydroxyl groups of different resin molecules to cause cross-linking.

By a polyvinyl partial acetal resin is meant a derivative of polyvinyl alcohol in which part of the hydroxyl groups of the resin are reacted with aldehydes, such as formaldehyde, acetaldehyde, propionaldehyde, butyraldehyde, valeraldehyde or hexaldehyde. The degree of acetalization with each particular aldehyde is sufficiently high so that water-insoluble products are obtained, but in each instance, the acetalization is not complete, and free hydroxyl groups are present in the polyvinyl partial acetal resins.

Various polyvinyl partial acetal resins and methods by which they may be formed are described in H. F. Robertson Patents Nos. 2,162,678, 2,162,679 and 2,162,680 and in G. A. Perkins Patent No. 2,194,613.

The polyvinyl partial butyral resins preferably employed in this invention are described in H. F. Robertson Patent No. 2,162,678. These resins may be defined as derivatives of polyvinyl alcohol in which from about 54% to about 78% of the hydroxyl groups have been combined with butyraldehyde, that is, the polyvinyl partial butyral resin is approximately 54% to 78% acetalized. Within this range, a resin which is approximately 66% acetalized, and which is derived from polyvinyl acetate of molecular weight from about 7000 to about 25,000 is preferred. In general, solutions of polyvinyl partial butyral resins derived from the polyvinyl acetate resins of lower molecular weight have lower viscosities.

The amount of glyoxal employed in the treatment of the polyvinyl partial acetal resins will vary according to the degree of acetalization of the vinyl resin. More glyoxal appears to be required with those resins which are less highly acetalized. In general, between 2 and 30 parts of glyoxal on a dry basis per 100 parts of polyvinyl partial acetal resin are satisfactory. The glyoxal is preferably employed in the form of an aqueous or alcoholic solution, because of the difficulty in isolating and handling pure, monomeric glyoxal.

The plastic compositions of this invention are suitable for a number of purposes. In combination with suitable plasticizers, they may be employed as interliners for laminated glass. They may also be employed in adhesive compositions for joining surfaces of wood, metals, leather, glass, plastics and the like. They appear especially suitable for laminating panels of plywood, employing both heat and pressure to effect the lamination. The plasticized compositions may also be used for coating cloth, wood, metal, leather, paper and other surfaces. In these coating applications, insolubilization may be effected either by air-drying or by baking.

Highly plasticized compositions may be molded into flexible articles and insolubilized by heat during the molding operation. Similarly, they may be extruded over wire to form an insulating coating. In either instance, the article may be given an additional heat treatment. In coating, adhesive, molding and extrusion compositions, fillers and pigments may be included, such as carbon black, calcium carbonate and silicon dioxide.

Because of their resistance to alcohols, ketones, esters, oils, hydrocarbons and other liquids, and because of their reduced thermoplasticity, the glyoxal-treated resins of this invention are distinctly more durable in service than the present polyvinyl partial acetal resins.

Plasticizers may be present in the composition to the extent of about 10% to 150% of the polyvinyl partial acetal resin, depending on the flexibility required and the compatibility of the plasticizer with the glyoxal-treated resins. Castor oil, oleic acid and triethylene glycol di(2-ethyl butyrate) are compatible with the resins in relatively large proportions. Dibutoxyethyl phthalate, butyl phthalyl butyl glycollate and triethylene glycol di(2-ethylhexoate) are compatible in smaller proportions within the range stated. Examples of other suitable plasticizers for polyvinyl partial butyral resins are:

Triethylene glycol di(butyryl-lactate)
Triethylene glycol dibutyrate
1 to 4 carbon atom alkyl ethers of triethylene glycol benzoate (particularly the methyl, ethyl and butyl ethers)
Ethyl ether of pentaethylene glycol acetate
Cyclohexyl ether of ethylene glycol acetate
Di(ethoxy ethyl) adipate
Di(methoxy ethyl) succinate
Dioctyl phthalate
Dioctyl maleate
Tricresyl phosphate
Dibutyl tartrate
Dioctyl tartrate
Glyceryl diacetate
Methyl ether of tetraethylene glycol
Ethyl ether of tetraethylene glycol The addition of a permanently fusible phenol-formaldehyde resin, such as a condensation product of paratertiarybutyl phenol and formaldehyde made in the presence of an acid catalyst, is beneficial in increasing the water-resistance of the coatings made from the composition. Larger amounts of glyoxal appear to be required when such phenol resins are included in the coating.

Heat-hardenable phenol-formaldehyde resins made in the presence of an alkaline catalyst may also be included in the coating. Such resins have the effect of not only increasing the water resistance of the coating, but they also enhance the insolubilization of the polyvinyl partial acetal resins. This enhancement is particularly noticeable on baking the compositions, but the heat-hardenable phenol-formaldehyde resins also improve the resistance of the resins to solvents on air-drying. Such compositions may be employed as wire enamels, in which instance they are desirably given a preliminary bake at a temperature of about 250° F., followed by a final bake at a temperatuare of about 800° F.

The following examples will serve to illustrate the invention.

*Example 1*

One part of a polyvinyl partial butyral resin, approximately 66% acetalized with butyraldehyde, was dissolved in 2.5 parts of acetone and 2.5 parts of ethanol containing 0.05 part of glyoxal dissolved in water. A film was cast from this solution on a glass plate. Upon drying for about 24 hours, a clear film was obtained which was no longer soluble in alcohol.

*Example 2*

Seventy-six parts of a polyvinyl partial butyral resin, approximately 66% acetalized with butyraldehyde, 30 parts of triethylene glycol di(2-ethylhexoate) and 3 parts of a 53% aqueous solution of glyoxal were milled on a rubber mill for about 5 to 10 minutes at about 220° F. A flexible, clear, resilient sheet of high tensile strength was obtained which retained its flexibility at 0° F. This sheet was insoluble in alcohol and it had a much higher softening point or fusion point than similar plasticized sheets which did not contain glyoxal. These sheets may be obtained in a thickness varying from 0.005 to 0.10 of an inch depending on the mill or calender setting. The sheeting may be used as a wrapping material, insulating tape, raincoat material, or sanitary sheeting. It may be employed as an adhesive interlayer for laminating glass, glywood or metal sheets. The higher softening point of the sheeting, as well as its improved resistance to solvents, makes it of particular value in such adhesive compositions. However, the composition may still be rendered soft and tacky by the application of heat at temperatures of about 200° to 250° F., and the usual heat and pressure methods of lamination may be employed.

The sheeting may be obtained with a glossy surface, as the surface tackiness of the sheet is less than that of similar sheets which do not contain glyoxal. However, a matte or frosted surface may be imparted to the sheet by using calendai rolls which have been appropriately sandblasted.

*Example 3*

The following compositions were prepared:

| | A | B | C | D | E |
|---|---|---|---|---|---|
| Polyvinyl partial butyral resin (66% acetalized) | 100 | 100 | 100 | 100 | 100 |
| Castor oil | 75 | 75 | | | |
| Oleic acid | | | 75 | 75 | 75 |
| Glyoxal | 5 | 10 | 5 | 10 | 20 |

Each composition was dissolved in a mixture of acetone, water and ethanol, and films were cast from these solutions on glass plates. After air-drying the films, or baking them for 30 to 60 minutes at 250° F., each composition became insoluble in alcohols. The compositions containing the greater amounts of glyoxal had the higher softening points.

*Example 4*

The following lacquer illustrates the addition of a phenol resin to the composition:

| | Parts by weight |
|---|---|
| Polyvinyl partial butyral resin (66% acetalized) | 15 |
| Permanently fusible paratertiarybutyl phenol-formaldehyde resin | 0.75 |
| Glyoxal (50% aqueous solution) | 1.5 to 3.0 |
| Castor oil | 3.75 |
| Triethylene glycol di(2-ethylhexoate) | 3.75 |
| Ethanol (190 proof) | 58 |
| Acetone | 27 |

Films deposited from this solution have softening points above 150° F., and have good resistance to water, after air-drying them for several days, or baking them for one hour at 250° F. The composition is useful as a clear coating for cloth and paper. Pigments may, of course, be added.

*Example 5*

The following is an example of an adhesive composition which has good resistance to solvents.

| | Per cent |
|---|---|
| Polyvinyl partial butyral resin (66% acetalized) | 15 |
| Glyoxal solution (43.7% in water) | 3.4 |
| Light hydrocarbon distillate | 41.6 |
| Ethanol (190 proof) | 20.0 |
| Acetone | 20.0 |
| | 100.0 |

The above composition may be used for bonding metals, glass, wood, leather, cloth and artificial resins to each other, or to bond one of such materials to another material. Films deposited from this solution became insoluble after air-drying them for 24 hours. To impart greater flexibility to the films, plasticizers, such as dimethyl phthalate, triethylene glycol di(2-ethylhexoate), castor oil and oleic acid may be added. Plasticization also lessens to a slight extent the adherence and solvent-resistance of the composition, and increases the drying time to about 48 hours.

*Example 6*

This example illustrates an air-drying, solvent-resistant coating for maintenance applications, including both a primer coating and a finishing coating.

| | Primer coating | Finishing coating |
|---|---|---|
| | Per cent | Per cent |
| Polyvinyl partial butyral resin (66% acetalized) | 9.43 | 10.50 |
| Cresol-formaldehyde resin | 9.43 | |
| Glyoxal (50% aqueous solution) | 2.17 | 2.43 |
| Di(butoxyethyl) phthalate | 1.89 | 1.57 |
| Zinc tetraoxychromate | 9.43 | |
| Titanium dioxide | | 10.50 |
| Butanol | 6.14 | 6.82 |
| Isopropanol | 17.45 | 19.40 |
| Acetone | 4.72 | 5.25 |
| Ethanol (190 proof) | 9.43 | 10.50 |
| Light hydrocarbon distillate | 29.91 | 33.03 |
| | 100.00 | 100.00 |

After thinning with a mixture of hydrocarbons and alcohol, each coating was readily applied over metals by brushing. Successive coats did not lift the underlying coat, even when applied after an interval of only 20 minutes. The paint may also be applied by spraying, particularly if the pigments are incorporated into the resin on a two roll mill, since the milling of the polyvinyl partial butyral resin decreases its tendency to "cobweb" on spraying. The finish is unusually resistant to organic solvents and resin solutions which normally adhere to and soften other air-drying finishes. It serves to protect the surface from rusting under humid conditions.

*Example 7*

The following clear varnish was prepared:

| | Percent |
|---|---|
| Polyvinyl partial butyral resin (66% acetalized) | 7.7 |
| Glyoxal solution (43.2% in water) | 1.5 |
| Heat-hardenable phenol-formaldehyde resin (60% solution in ethanol) | 7.7 |
| Di(butoxyethyl) phthalate | 1.0 |
| Ethanol (190 proof) | 29.9 |
| Acetone | 13.8 |
| Light hydrocarbon distillate | 38.4 |
| | 100.0 |

A piece of wood was coated with this solution and the varnish permitted to air-dry. The wood was then cemented to the bottom of a glass tube, with the coated side up, employing the same solution as an adhesive. After a further drying period, the tube was filled with a gasoline having a high percentage of aromatic constituents. After 30 days, the gasoline had not penetrated the coating nor softened it. The varnish is suitable for coating plywood gasoline tanks for aircraft.

*Example 8*

A sample of a water-insoluble polyvinyl acetal resin partially acetalized with hexaldehyde was combined with 80% of castor oil based on the resin, and 5% of glyoxal based on both the resin and plasticizer. Films were cast from solutions of this composition, and permitted to air-dry for two days. These films were insoluble in methyl ethyl ketone, whereas a control film was soluble in this solvent.

Modifications of the invention other than as specifically illustrated in the preceding examples are included within the scope of the invention.

We claim:

1. A plastic composition containing a water-insoluble, originally alcohol-soluble resinous partial acetal of polyvinyl alcohol and an aliphatic monoaldehyde combined with from 2 to 30% by weight of the resin on a dry basis of an aliphatic dicarbonylic compound of the group consisting of glyoxal and methyl glyoxal.

2. An alcohol-insoluble composition comprising a water-insoluble, originally alcohol-soluble resinous partial acetal of polyvinyl alcohol and an aliphatic monoaldehyde combined with from 2 to 30% of glyoxal by weight of the resin on a dry basis.

3. An alcohol-insoluble composition comprising a water-insoluble polyvinyl partial butyral resin combined with from 2 to 30% of glyoxal by weight of the resin on a dry basis.

4. A composition adapted to deposit a film which becomes insoluble in alcohol on air-drying, comprising a solution of aqueous glyoxal and a water-insoluble, alcohol-soluble resinous partial acetal of polyvinyl alcohol and an aliphatic mono-aldehyde, the amount of glyoxal being from 2 to 30% by weight of the resin on a dry basis.

5. A film-forming composition comprising a water-insoluble polyvinyl partial butyral resin, glyoxal and aqueous ethanol as a solvent, the amount of glyoxal being from 2 to 30% by weight of the resin on a dry basis.

6. An air-drying paint comprising a water-insoluble polyvinyl partial butyral resin, glyoxal, a plasticizer, a pigment and a solvent, the amount of glyoxal being from 2 to 30% by weight of the resin on a dry basis.

7. A coating composition comprising a water-insoluble, originally alcohol-soluble resinous partial acetal of polyvinyl alcohol and an aliphatic monoaldehyde, glyoxal, a phenol-formaldehyde resin, and a solvent, the amount of glyoxal being from 2 to 30% by weight on a dry basis of the polyvinyl partial acetal resin.

8. An air-drying coating composition comprising a water-insoluble, originally alcohol-soluble resinous partial acetal of polyvinyl alcohol and an aliphatic monoaldehyde, glyoxal, a heat-hardenable phenol-formaldehyde resin, and a solvent, the amount of glyoxal being from 2 to 30% by weight on a dry basis of the polyvinyl partial acetal resin.

9. Flexible, resilient, and alcohol-insoluble sheet material comprising a water-insoluble polyvinyl partial butyral resin combined with glyoxal and a plasticizer, the amount of glyoxal being from 2 to 30% by weight of the resin on a dry basis.

10. A coating composition comprising a water-insoluble polyvinyl partial butyral resin, glyoxal, a phenol-formaldehyde resin, and a solvent, the amount of glyoxal being from 2 to 30% by weight of the polyvinyl resin on a dry basis.

11. An air-drying coating composition comprising a water-insoluble polyvinyl partial butyral resin, glyoxal, a heat-hardenable phenol-formaldehyde resin, and a solvent, the amount of glyoxal being from 2 to 30% by weight of the polyvinyl resin on a dry basis.

12. Process for coating articles which comprises applying to the surface of the article a composition containing glyoxal and a water-insoluble, originally alcohol-soluble resinous partial acetal of polyvinyl alcohol with an aliphatic monoaldehyde to form a film thereon, and baking said film at an increasing temperature up to about 250° F., whereby the glyoxal is combined in the film without excessive volatilization thereof, the amount of glyoxal combined in the film being from 2 to 30% by weight of the resin on a dry basis.

13. Process for coating articles which comprises applying to the surface of the article a composition containing a water-insoluble polyvinyl partial butyral resin and glyoxal to form a film thereon, and air-drying said film at ordinary temperatures, whereby the glyoxal combines with the acetal resin to form a solvent-resistant coating on said article, the amount of combined glyoxal being from 2 to 30% by weight of said resin on a dry basis.

HOWARD D. COGAN.
RICHARD W. QUARLES.